United States Patent [19]
DiStefano

[11] Patent Number: 6,103,115
[45] Date of Patent: Aug. 15, 2000

[54] WASTEWATER SKIMMINGS DEWATERING UNIT

[76] Inventor: Jonathan DiStefano, Rte. 1, Box 9-C, Huttonsville, W. Va. 26273

[21] Appl. No.: 09/268,860

[22] Filed: Mar. 15, 1999

[51] Int. Cl.[7] .................................................. B01D 29/27
[52] U.S. Cl. ........................ 210/232; 210/238; 210/315; 210/337; 210/484
[58] Field of Search .................................. 210/232, 238, 210/315, 337, 338, 489, 474, 477, 484, 314

[56] References Cited

U.S. PATENT DOCUMENTS

| | | |
|---|---|---|
| 723,091 | 3/1903 | Webb et al. . |
| 1,711,949 | 5/1929 | Keppler . |
| 4,268,392 | 5/1981 | Hayes . |
| 4,495,072 | 1/1985 | Fields . |
| 4,804,470 | 2/1989 | Calvillo et al. . |
| 5,186,828 | 2/1993 | Mankin . |
| 5,988,190 | 11/1999 | Borges . |

FOREIGN PATENT DOCUMENTS

WO 95/02440  1/1995  European Pat. Off. .

Primary Examiner—David A. Simmons
Assistant Examiner—Fred Prince
Attorney, Agent, or Firm—Joseph N. Breaux

[57] ABSTRACT

A wastewater skimmings dewatering unit that includes a drip bucket having a bucket compartment having an open top defined by a threaded lip and a bottom through which a number of drain opening are provided; a locking ring with the center opening and an internally threaded inner edge that is companionately threaded to engage the threaded lip of the drip bucket; a dewatering sack constructed from nylon mesh screening having a top edge that is sized to fit over the threaded lip of the drip bucket such that a sack bottom is suspended above the bottom and held in place by screwing the locking ring onto the threaded lip of the drip bucket.

2 Claims, 1 Drawing Sheet

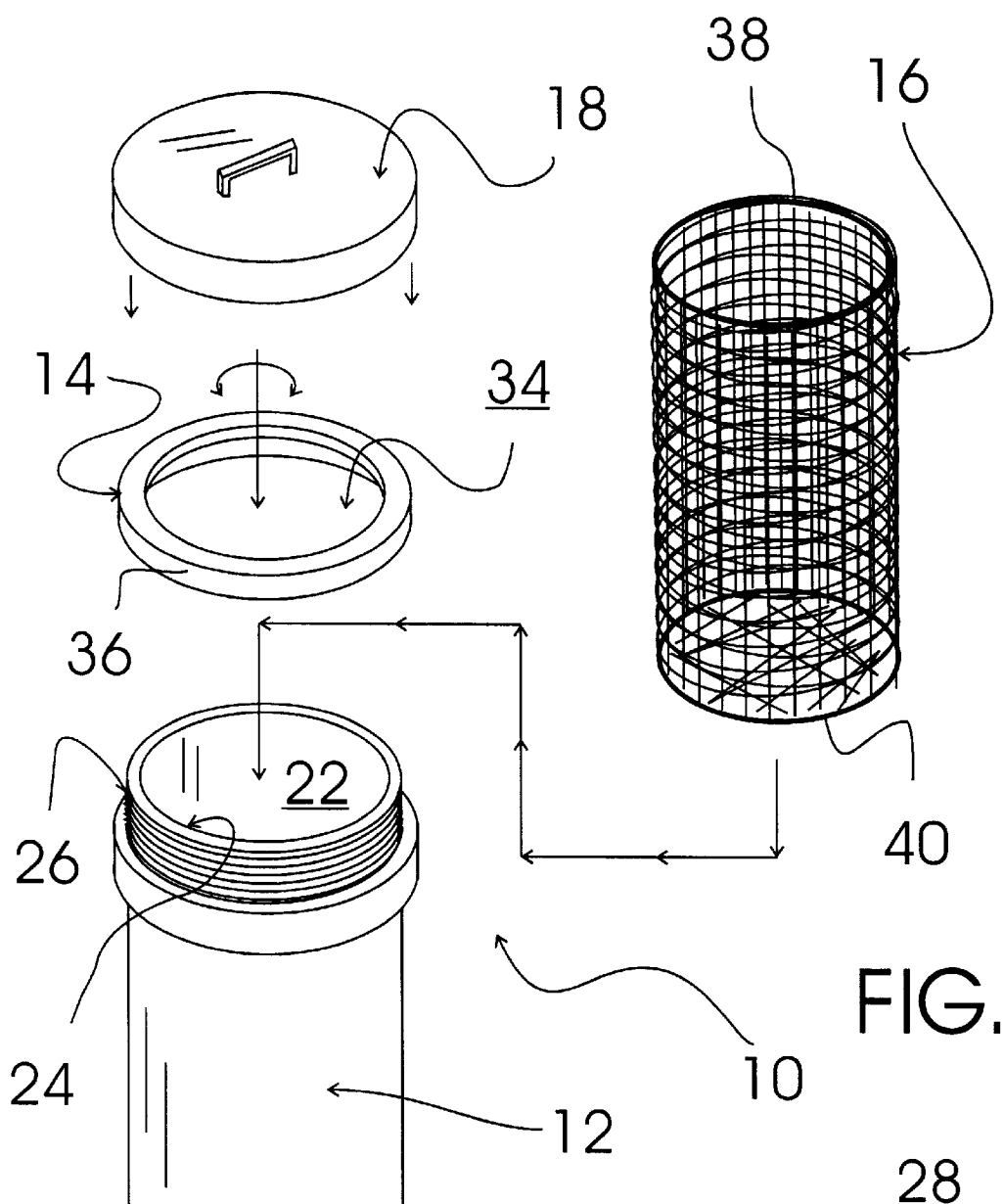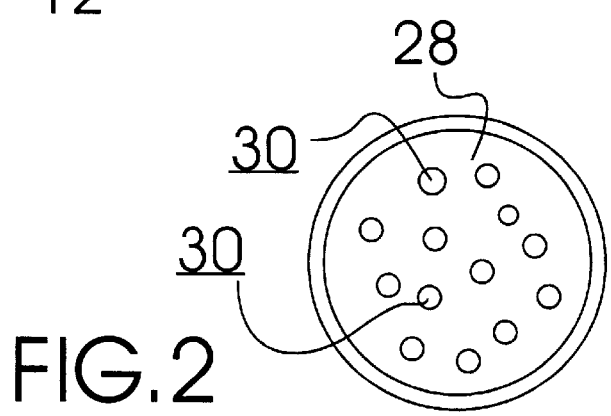

WASTEWATER SKIMMINGS DEWATERING UNIT

TECHNICAL FIELD

The present invention relates to refuse disposal devices and more particularly to a dewatering unit for draining the water from wastewater skimmings; the dewatering unit including a drip bucket having a bucket compartment having an open top defined by a threaded lip and a bottom through which a number of drain openings are provided; a locking ring with the center opening and an internally threaded inner edge that is companionately threaded to engage the threaded lip of the drip bucket; a dewatering sack constructed from nylon mesh screening having a top edge that is sized to fit over the threaded lip of the drip bucket such that a sack bottom is suspended above the bottom and held in place by screwing the locking ring onto the threaded lip of the drip bucket.

BACKGROUND OF INVENTION

Solids floating at or near the surface of wastewater treatment tanks are often skimmed from the tank to expedite waste treatment. Although removing the skimmed solids can expedite treatment, the skimmed solids are typically mixed with liquids and can, therefore, pose a disposal problem. It would be benefit, therefore, to have a dewatering unit into which the skimmed solids/liquid mixture can be deposited wherein the liquids are removed from the solids. It would of course be a benefit to have a dewatering unit that was inexpensive to manufacture.

SUMMARY OF INVENTION

It is thus an object of the invention to provide a wastewater skimmings dewatering unit for removing liquids from the skimmed solids/liquids from the surface of a wastewater treatment tank.

It is a further object of the invention to provide a wastewater skimmings dewatering unit that is inexpensive to manufacture.

It is a still further object of the invention to provide a wastewater skimmings dewatering unit that includes a drip bucket having a bucket compartment having an open top defined by a threaded lip and a bottom through which a number of drain opening are provided; a locking ring with the center opening and an internally threaded inner edge that is companionately threaded to engage the threaded lip of the drip bucket; a dewatering sack constructed from nylon mesh screening having a top edge that is sized to fit over the threaded lip of the drip bucket such that a sack bottom is suspended above the bottom and held in place by screwing the locking ring onto the threaded lip of the drip bucket.

It is a still further object of the invention to provide a wastewater skimmings dewatering unit that accomplishes all or some of the above objects in combination.

Accordingly, a wastewater skimmings dewatering unit is provided. The wastewater skimmings dewatering unit includes a drip bucket having a bucket compartment having an open top defined by a threaded lip and a bottom through which a number of drain opening are provided; a locking ring with the center opening and an internally threaded inner edge that is companionately threaded to engage the threaded lip of the drip bucket; and a dewatering sack constructed from nylon mesh screening having a top edge that is sized to fit over the threaded lip of the drip bucket such that a sack bottom is suspended above the bottom and held in place by screwing the locking ring onto the threaded lip of the drip bucket. If desired a snap on cover can be provided.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is an exploded perspective view showing an exemplary embodiment of the wastewater skimmings dewatering unit of the present invention showing the drip bucket with the threaded lip; the locking ring with the center opening and the internally threaded inner edge; the dewatering sack constructed from nylon mesh screening; and the snap on lid; and a snap on cover member.

FIG. 2 is a underside plan view showing the drain openings provided through the bottom surface of the drip bucket.

EXEMPLARY EMBODIMENTS

FIG. 1 is an exploded perspective view showing an exemplary embodiment of the wastewater skimmings dewatering unit of the present invention, generally designated by the numeral 10. Dewatering unit 10 includes a drip bucket, generally designated 12; a locking ring, generally designated 14; a dewatering sack, generally designated 16; and a snap on cover member, generally designated 18.

Drip bucket 12 is a six and one-half gallon (6½ gallon) capacity plastic bucket 20 having a bucket compartment 22, an open top 24 defined by a threaded lip 26 and a bottom 28 (FIG. 2) through which a number of drain openings 30 (FIG. 2) are provided. Locking ring 14 is a molded plastic ring having a center opening 34 and an internally threaded inner edge 36 that is companionately threaded to engage threaded lip 26 drip bucket 12.

In this embodiment, dewatering sack 16 is constructed from a section of nylon mesh screening that has been folded in half and stitched together along the side edges thereof with nylon thread. Dewatering sack 16 can of course be constructed in other manners consistent with providing a top edge 38 that is sized to fit over threaded lip 26 of drip bucket 12 such that a sack bottom 40 is suspended within bucket compartment 22 above the bottom 28 thereof (FIG. 2) and held in place by screwing locking ring 14 onto threaded lip 26 without departing from the spirit and scope of the invention taught herein. Cover member 18 is a molded plastic member sized to snap onto and over center opening 34 of locking ring 14.

With general reference to FIGS. 1 and 2, dewatering unit 10 is assembled by inserting dewatering sack 16 into bucket compartment 22, placing top edge 38 over threaded lip 26 and then securing dewatering sack 16 in place by screwing locking ring 14 onto threaded lip 26 making sure that sack bottom 40 is suspended above the bottom 28 of drip bucket 12. Wastewater skimmings are then placed into dewatering sack 16 through center opening 34 of locking ring 14 and cover member 18 snapped over locking ring 14. Dewatering unit 10 is then left for a period of time sufficient for the liquid portion of the wastewater skimmings to separate from the solids by dripping through sack bottom 40 and out of drip bucket 12 through drain openings 30.

It can be seen from the preceding description that a wastewater skimmings dewatering unit for removing liquids from the skimmed solids/liquids from the surface of a wastewater treatment tank has been provided that is inexpensive to manufacture and that includes a drip bucket having a bucket compartment having an open top defined by a threaded lip and a bottom through which a number of drain opening are provided; a locking ring with the center opening and an internally threaded inner edge that is companionately threaded to engage the threaded lip of the drip bucket; a dewatering sack constructed from nylon mesh screening having a top edge that is sized to fit over the threaded lip of the drip bucket such that a sack bottom is suspended above the bottom and held in place by screwing the locking ring onto the threaded lip of the drip bucket.

It is noted that the embodiment of the wastewater skimmings dewatering unit described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A wastewater skimmings dewaterring unit comprising:
   a drip bucket having a bucket compartment having an open top defined by a threaded lip and a bottom through which a number of drain openings are provided;
   a locking ring with a center opening and an internally threaded inner edge that is companionately threaded to engage said threaded lip of said drip bucket; and
   a dewatering sack constructed from mesh screening having a top edge that is sized to fit over said threaded lip of said drip bucket such that a sack bottom is suspended above said bottom and held in place by screwing said locking ring onto said threaded lip of said drip bucket.

2. The wastewater skimmings dewatering unit of claim 1, further including:
   a snap on cover sized to snap into connection with said locking ring and seal said center opening.

* * * * *